Figure 1:
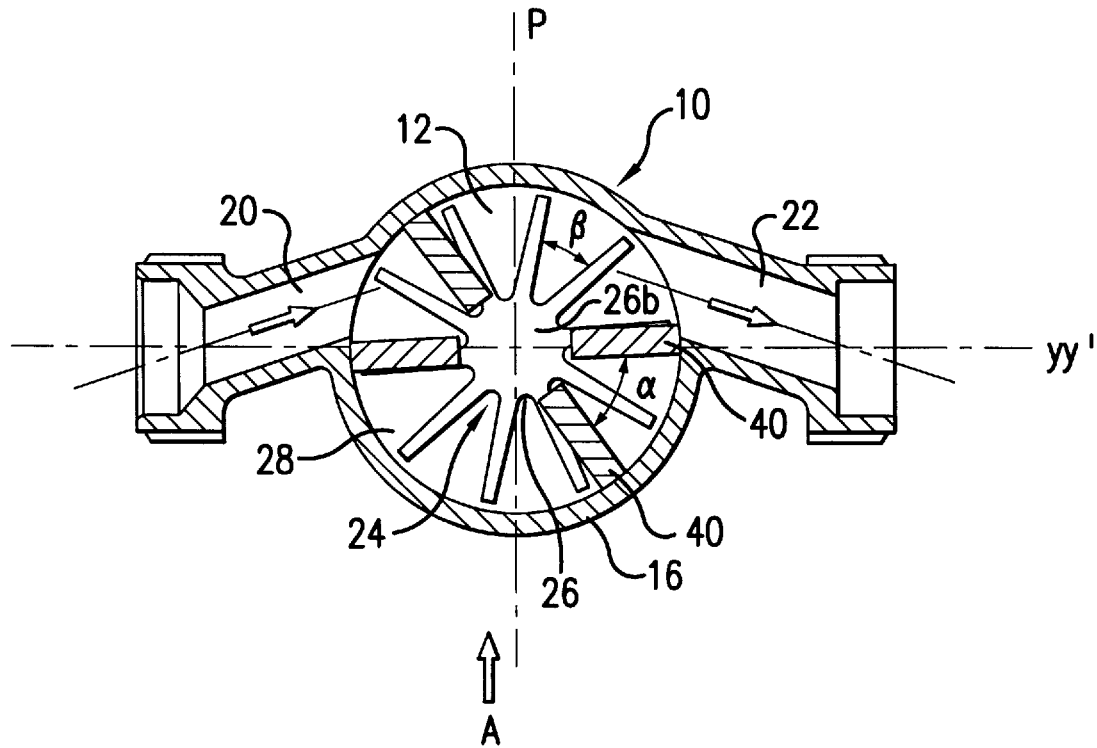

United States Patent
Von Bertrab

[19]

[11] Patent Number: 5,965,826
[45] Date of Patent: Oct. 12, 1999

[54] SINGLE JET LIQUID METER WITH IMPROVED SENSITIVITY AND REGULATION EFFECT

[75] Inventor: Olaf Von Bertrab, Oldenburg, Germany

[73] Assignee: Schlumberger Industries, S.R.L., Milan, Italy

[21] Appl. No.: 08/878,265

[22] Filed: Jun. 18, 1997

[30] Foreign Application Priority Data

Dec. 20, 1994 [EP] European Pat. Off. ............. 94203692

[51] Int. Cl.$^6$ ...................................................... G01F 1/06
[52] U.S. Cl. ..................... 73/861.87; 73/861.79
[58] Field of Search .................... 73/861.79, 861.86, 73/861.87, 861.88

[56] References Cited

U.S. PATENT DOCUMENTS

| | | | |
|---|---|---|---|
| 3,572,118 | 3/1971 | Hilzendegen | 73/861.79 |
| 4,512,201 | 4/1985 | Konrad et al. | 73/861.79 |
| 4,548,084 | 10/1985 | Onoda et al. | 73/861.87 |
| 5,099,699 | 3/1992 | Kobold | 73/861.79 |

*Primary Examiner*—Harshad Patel
*Attorney, Agent, or Firm*—Leonard W. Pojunas

[57] ABSTRACT

A single jet liquid meter includes a measurement chamber connected to an injector and an ejector and equipped with a turbine having a plurality of blades, two consecutive blades being disposed at an angle $\beta$, the measurement chamber having two end walls opposite to each other and perpendicular to the axis of the chamber, one of the two end walls being constituted by a plate equipped with an even number of ribs, n, greater than four, projecting in the chamber and equally distributed in two sets, two consecutive ribs of the same set being disposed at an angle $\alpha$ which is determined by the following conditions: $\alpha=(I+2/n)\beta/(n/2-1)$ and $(n/2-1)\alpha<90°$, where I is an integer value greater or equal to zero.

9 Claims, 4 Drawing Sheets

SINGLE JET LIQUID METER WITH IMPROVED SENSITIVITY AND REGULATION EFFECT

The present invention relates to a meter for liquid, in particular water, of the type having a single jet.

Single jet liquid meters are well-known and comprise a measuring chamber having first and second end walls perpendicular to the axis of said measuring chamber, an injector and an ejector in communication with said measuring chamber and a turbine which has a plurality of blades and which is mounted inside the measuring chamber.

The measuring chamber is fed by a single jet coming from the injector, which jet causes the turbine to rotate. Such meters comprise an upper portion, called totalizer, which counts, registers and displays the amount of liquid used from the rotation of the turbine.

The totalizer can be directly connected to the turbine by a mechanical transmission or indirectly through a magnetic drive system or through an electrophysical principle based device. Meters of this type often suffer from unsatisfied sensitivity at low flow rates.

Thus, above-described liquid meters of the single jet type generally comprise a pressure plate constituting one of the first and second end walls of the measuring chamber and which is often located in the closest part of said measuring chamber from the totalizer. The pressure plate is equipped with radiating ribs, for instance with two ribs being disposed at an angle of 180°.

Such a pressure plate aims at linearizing the error curve down to low flow rates. As a matter of fact, when a blade passes a rib the cross section available to the liquid flow is reduced and given that the liquid flow in a single jet meter has a higher velocity than the driven blades of the turbine, it ensures that an impulsion is communicated to the blade and therefore the turbine gets accelerated.

Moreover, due to the making process of single jet liquid meters, all manufactured meters cannot have all the required characteristics, in particular, the error curve is not always thoroughly inscribed within the authorized error channel. The pressure plate allows such meters to be regulated by rotating said pressure plate about the axis of the measuring chamber with a given angle of rotation.

This rotation causes the error curve to shift up or down and consequently to inscribe it within the error channel.

Although a two ribs equipped meter offers a better sensitivity than a simple meter without any ribs, such a meter still suffers from the drawback of having an insufficient sensitivity at low flow rates.

An object of the invention is to provide a single jet liquid meter with an improved sensitivity at low flow rates, while keeping the possibility of regulating the error curve of said meter.

The present invention provides a single jet liquid meter comprising: a measuring chamber having first and second end walls perpendicular to the axis of said measuring chamber and opposite to each other, an injector and an ejector in communication with said measuring chamber, a turbine having a plurality of blades, two consecutive blades being disposed at an angle $\beta$, at least one end wall being constituted by a plate equipped on one face with n radiating ribs projecting in said measuring chamber, the meter being characterized in that n is an even number at least equal to four, said radiating ribs are equally distributed in two sets, each set of radiating ribs corresponding to one half circle of said plate face and two consecutive ribs of the same set being disposed at an angle $\alpha$ which is determined by the following conditions:

$$\alpha = (I + 2/n)\beta/(n/2 - 1)$$

and $$(n/2 - 1)\alpha < 90°$$

I being an integer value greater or equal to zero.

These conditions give the values of the angle $\alpha$ between two consecutive ribs of the same set that can be chosen in order to improve the performance of liquid meter at low flow rates without losing the possibility of regulating the error curve of said meter.

In a preferred embodiment, n equals to four.

According to the value of the angle $\beta$, particularly when $\beta$ equals to 30°, 36° or 45° which respectively corresponds to a twelve, ten or eight blades turbine, the integer value I is inferior to three.

More precisely, I equals to one and $\alpha$ equals approximately to 54°, that is within a range of ±5% of said $\alpha$ value which corresponds to a ten blades turbine ie $\beta$ equals to 36°.

In another embodiment, n equals to six.

According to the value of the angle $\beta$, particularly when $\beta$ equals to 30°, 36° or 45° which respectively corresponds to a twelve, ten or eight blades turbine, the integer value I is greater than zero.

More precisely, I equals to one and $\alpha$ equals approximately to 30° which corresponds to a eight blades turbine ie $\beta$ equals to 45°.

In a still further embodiment, n equals to eight.

According to the value of the angle $\beta$, particularly when $\beta$ equals to 30°, 36° or 45° which respectively corresponds to a twelve, ten or eight blades turbine, the integer value I is greater than zero.

It is preferable not to exceed eight radiating ribs on a plate for keeping the possibility of regulating the error curve of the meter.

The meter also comprises a totalizer which is mounted adjacent to the second end wall of the measuring chamber.

According to a preferred embodiment of the invention, the end wall constituted by a plate equipped with n radiating ribs projecting in the measuring chamber is the second end wall. This end wall can be also the first end wall of said measuring chamber which is opposite to the second one.

Figure 2:
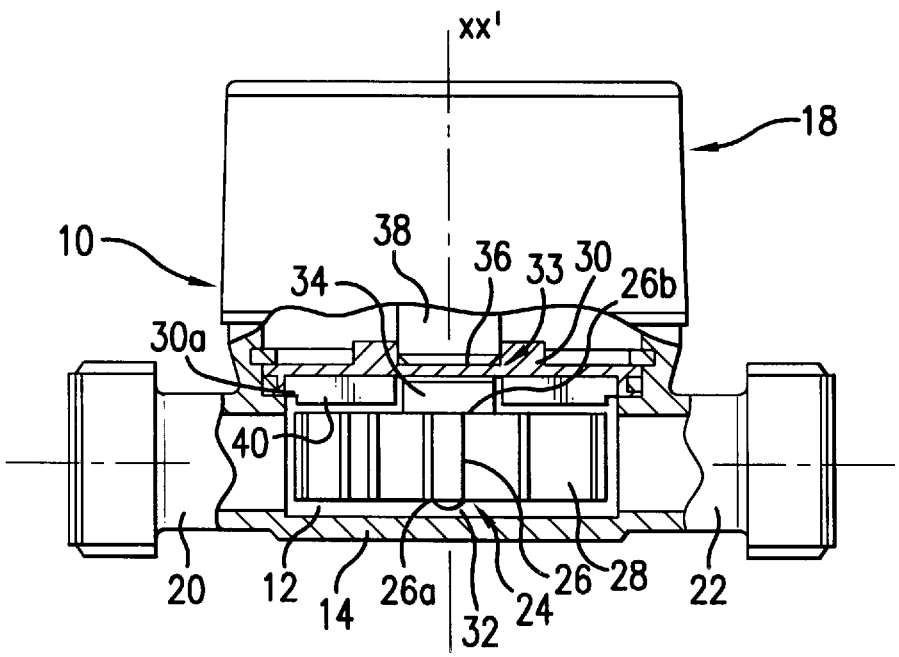
Figure 3:
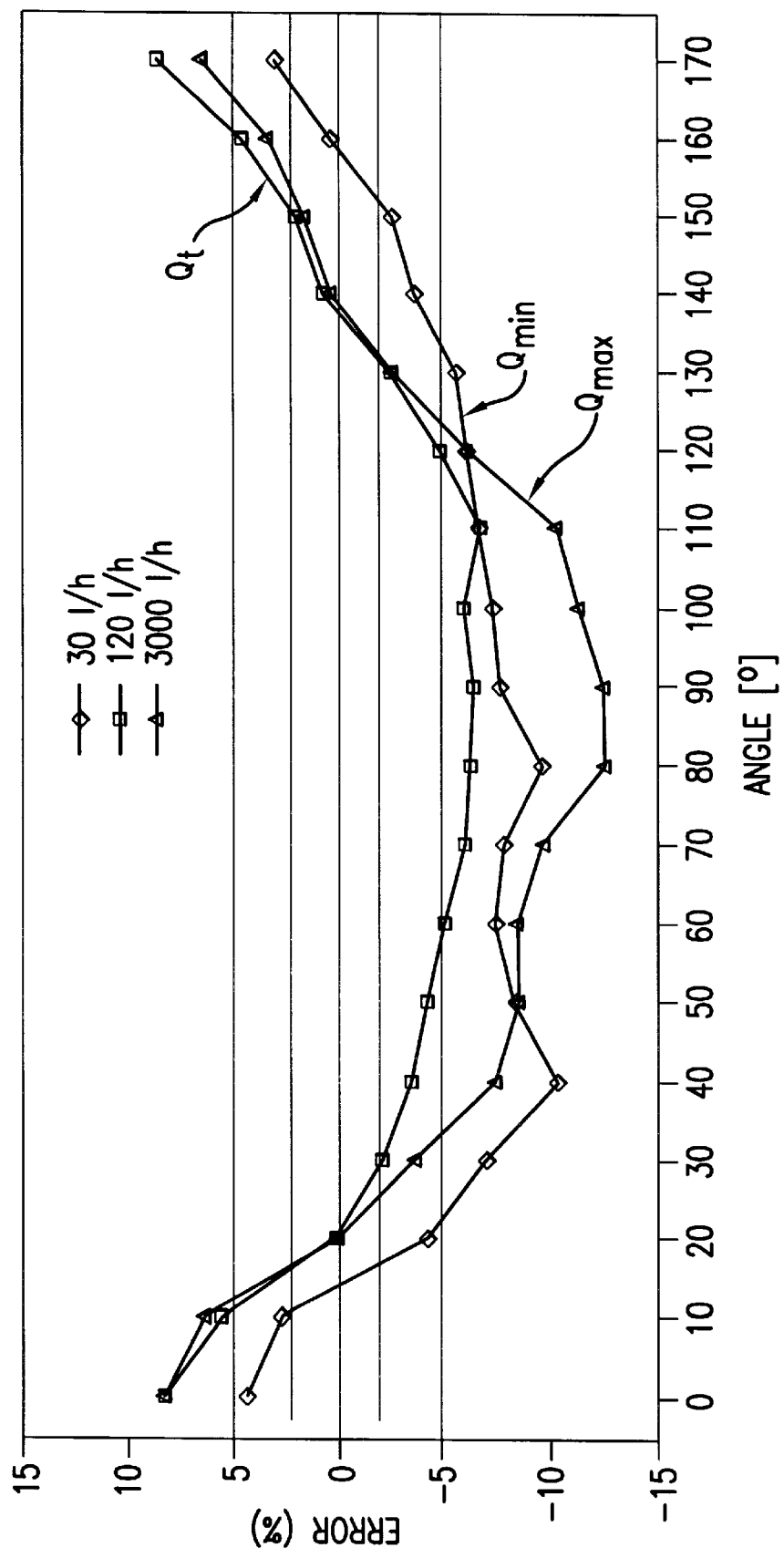
Figure 4:
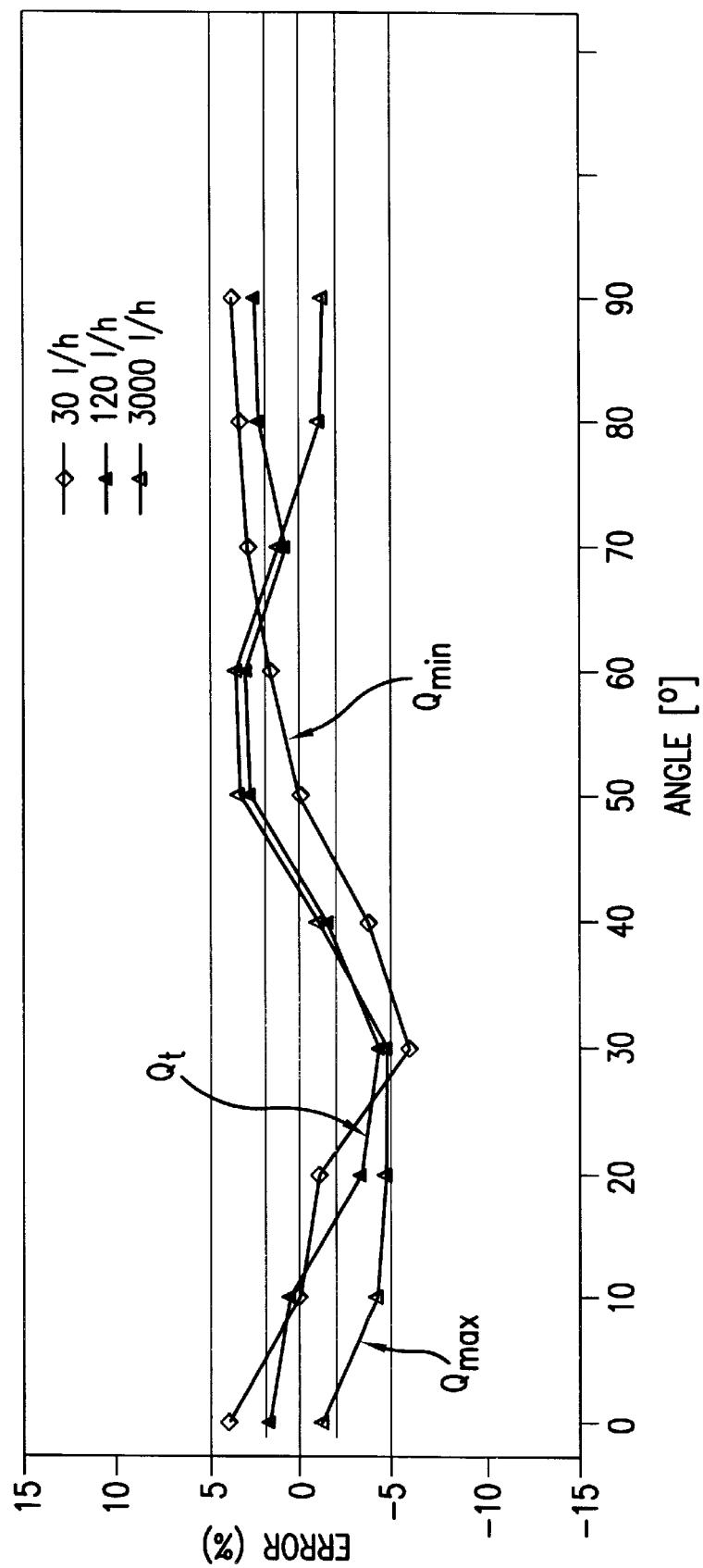

An embodiment of the invention will now be described, by way of example, with reference to the accompanying drawings in which:

FIG. 1 is a plan view looking down on the body of a single jet water meter according to an embodiment of the invention, FIG. 2 is a view taken in the direction of the arrow A in FIG. 1 showing the interior of the meter, FIG. 3 is a graph representing the evolution of the relative error in the measured flowrate in function of the angle of which the pressure plate has been rotated about the axis XX' for three given flow rates and for a two radiating ribs pressure plate equipped meter (prior art), said two ribs being angularly spaced from 180°, FIG. 4 is a graph representing the evolution of the relative error in the measured flowrate in function of the angle of which the pressure plate has been rotated about the axis XX' for three given flow rates and for a four radiating ribs pressure plate equipped meter, said four ribs being angularly spaced from 90°.

Figure 5:
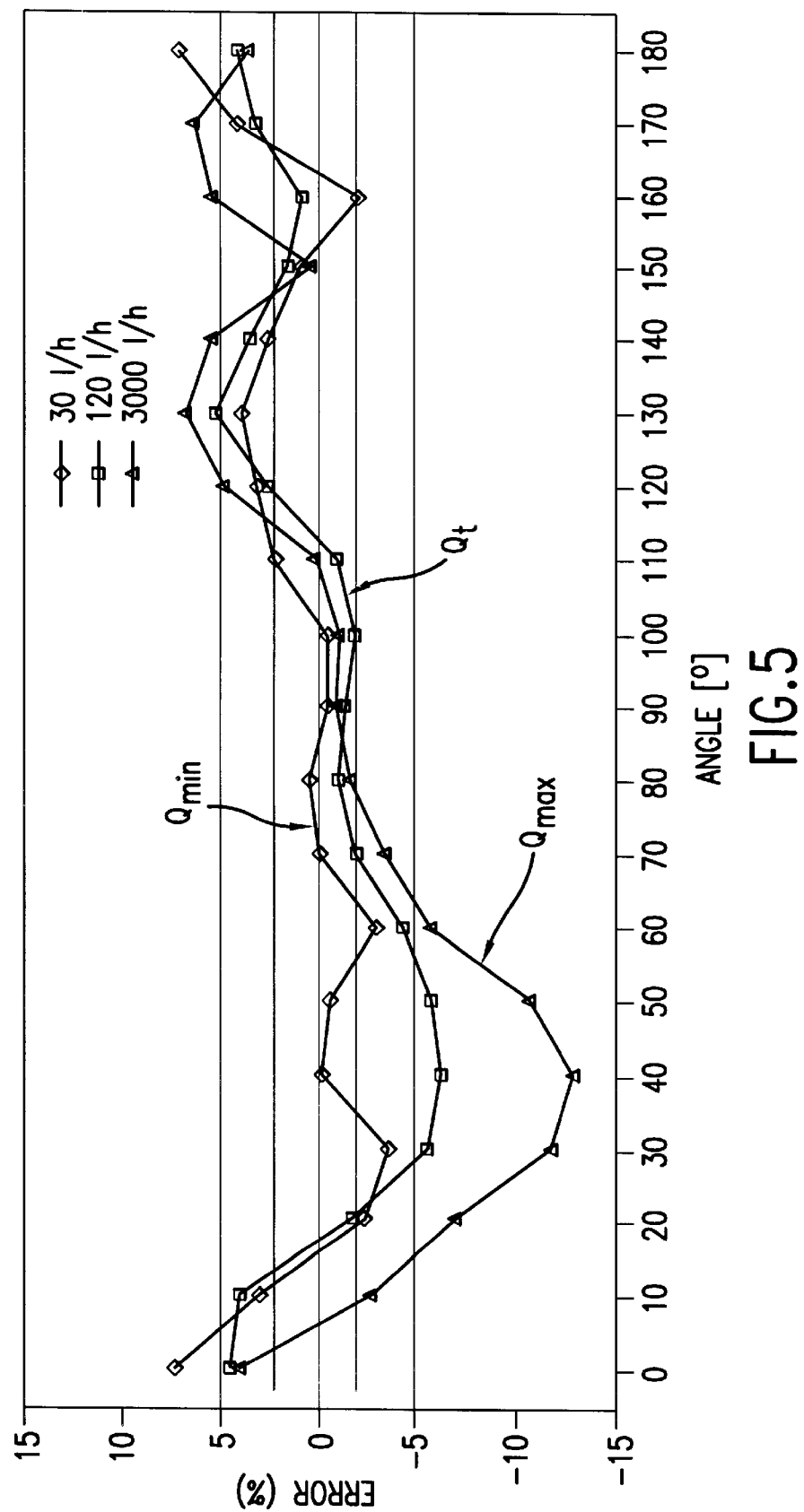

FIG. 5 is a graph representing the evolution of the relative error in the measured flowrate in function of the angle of which the pressure plate has been rotated about the axis XX' for three given flow rates and for the embodiment of the invention represented in FIGS. 1 and 2.

FIGS. 1 and 2 show a body assembly for a single jet water meter in accordance with the invention. The body comprises a bowl 10 which is circularly symmetrical about an axis XX'. The bowl 10 defines a lower cylindrical portion 12 of reduced diameter and delimited by a bottom 14 constituting a first end wall perpendicular to the axis XX' and a side wall 16, together with an upper portion 18 of greater diameter, called totalizer. The meter body also comprises an injector 20 which communicates with the bottom portion 12, and an ejector 22 which likewise communicates with said bottom portion 12.

As shown in FIG. 2, the injector 20 and ejector 22 are inclined with regard to an axis YY' which is perpendicular to the axis XX'. The injector 20 and ejector 22 are symmetrical about a plane P including the axis XX', the axis YY' being perpendicular to said plane P. Thus, water flow penetrates into the bottom portion 12 and leaves out said portion tangentially with regard to the circular section of cylindrical portion 12.

The bottom portion 12 constitutes the measuring chamber of the meter in which a turbine 24 is mounted. The turbine has a hub 26 and a plurality of straight blades 28 fixed to said hub and regularly spaced one from another. Two consecutive blades 28 are disposed at an angle β. For instance, there are ten blades and the angle β equals to 36°.

The upper portion 18 or totalizer serves to accommodate register and display means which are not shown in FIGS. 1 and 2. As can be seen in FIG. 2, the bottom and top portions 12 and 18 are separated in a watertight manner by a second end wall 30 opposite the first end wall 14 (bottom) and which is also perpendicular to the axis XX'. This second end wall 30 is called pressure plate. The hub 26 has first and second end faces 26a and 26b disposed opposite the first and second end walls 14 and 30 respectively. The first end face 26a of hub 26 holds a pivot shaft 32 disposed along the axis XX' of the meter bowl. The first end wall 14 is fitted with a bearing material (which is not represented in FIG. 2) suitable for cooperating with the point of the pivot shaft 32. The bearing material thus constitutes a bottom axial stop or abutment for the turbine.

A magnetic drive system 33 is schematically represented in FIG. 2 and comprises two parts: a first one 34 is mounted on the second end face 26b of hub 26 and faces a central portion 36 of pressure plate 30. The central portion 36 is aligned with the axis XX'.

A second part 38 of the magnetic drive system 33 is located above the central portion 36 of the pressure plate 30 along the axis XX' and is partially represented.

The overall operation of the meter can be understood from the above description: the injector 20 is connected to an upstream water inlet pipe and causes the flow to penetrate into the measuring chamber 12. In the measuring chamber 12 the jet of water causes the turbine 24 to rotate and the water flow then leaves via the ejector 22. The speed of rotation of the turbine is proportional to the speed of the water flow. The totalizer 18 is driven by the turbine 24 through the magnetic drive system 33 and serves to register and display the amount of flowing water through the measurement chamber 12.

Returning to the pressure plate 30 located above the measuring chamber 12 and separating this chamber from the totalizer 18, it can be seen that the lower face 30a of said plate 30 is equipped with n radiating ribs 40 which project from said lower face in the measuring chamber 12. The number n of radiating ribs 40 is an even number which is at least equal to 4.

According to the above-described embodiment, n equals to four. The radiating ribs are equally distributed in two sets of ribs, each set of ribs being located in one half circle of the lower plate face 30a. As shown in FIG. 1, the two consecutive ribs of the same set are disposed at an angle α which approximately equals to 54°.

By way of example, each rib has a height of 3.1 mm and a width of 3.5 mm and a blade has a height of 12 mm.

More generally, the Applicant found that the angle α should be determined by the following conditions $$\alpha = (I+2/n)\beta/(n/2-1)$$

and $$(n/2-1)\alpha < 90°$$

where I is an integer value, in order to improve the sensitivity of the meter while keeping the possibility of regulating the error curve of the meter if it is required after the meter manufacturing and assemblying process.

Once the configuration of the turbine is determined, that is the angle α has a fixed value, it is theoretically possible to choose several values of angle α with different values of ribs number n.

For instance, when β equals to 36°, it is possible to obtain: for n=4 $\alpha = (I+1/2)\beta$ and α<90°

| | |
|---|---|
| I = 0 | α = 18° |
| I = 1 | α = 54° | the other values of integer I leading to angles α greater or equal to 90°.
for n=6 $\alpha = (I+1/3)\beta/2$ and α<45°.

| | |
|---|---|
| I = 0 | α = 6° |
| I = 1 | α = 24° |
| I = 2 | α = 42° | the other values of integer I leading to angles α greater than 45°.
for n=8 $\alpha = (I+1/4)\alpha/3$ and α<30°

| | |
|---|---|
| I = 0 | α = 3° |
| I = 1 | α = 15° |
| I = 2 | α = 27° | the other values of integer I leading to angles α greater than 30°.

Above n=8 it is technically difficult to dispose four metallic radiating ribs on each half circle of pressure plate face 30a, due to the necessary width of the ribs in order to ensure a sufficient mechanical strength.

Moreover, it could lead to loose the possibility of regulating the error curve of the meter.

From the above cited values, it can be clearly understood that small values of angle α such as 3°, 6° and even 15° and 18° are difficult to implement because of the width of metallic ribs. However, small values of angled α such as 15°, 18° can lead to good results if the ribs are made up with a material adapted to ensure a sufficient mechanical strength, thereby allowing to have thinner ribs.

For instance, very good results can be obtained for a value of angle α equal approximately to 54° with four metallic ribs but other calculated values with varied numbers of ribs are not excluded.

In addition, it is to be noted that for a calculated value of angle α as for instance α=54°, the term "approximately" means that good results of both regulation effect and sensitivity can also be reached within a range of ±5% of α value.

When a blade 28 of the turbine 24 passes a rib, the cross-section available to the water flow is reduced. Given that the flow has a higher speed than that one of the blades, said flow will transmit energy to the turbine through the passing blade and the turbine will get accelerated. The above cited formula guarantees that two blades do not pass the ribs at the same time and that energy impulses are transmitted to the blades of the turbine by the flow with the same frequency. As a matter of fact, the Applicant found that reducing two cross-sections for the flow at the same time has very little effect. The energy of the flow is therefore better used with the invention what improves the sensitivity.

It has also been found that when the number of ribs increase or the number of blades decrease, the turbine rotates with a smaller velocity. This ensures that the velocity difference between the flow and the turbine increases, thereby allowing a more efficient transmission of energy from the flow to the turbine and a better sensitivity. Consequently, with a number of ribs equals to four and a value of the angle β equals to 45°, which corresponds to a eight blades turbine, it is possible to choose approximately α=67,5° (I=1) for achieving the object of the invention.

FIGS. 3 to 5 are graphs on which are drawn curves representing for a given configuration of a single jet water meter and for predetermined flow rate values the evolution of the relative error in the measured flow rate in function of the angle of which the pressure plate has been rotated about the axis XX'.

Each graph comprises three curves, each one corresponding to a different value of flow rate: Qmin is the minimum flow rate (30 l/h), Qt is the transition flow rate that is the flow rate at which the authorized error changes (120 l/h) and Qmax is the maximum flow rate (3000 l/h). As shown in FIG. 3, the first graph has been obtained for a meter equipped with a two radiating ribs pressure plate, said two ribs being disposed at an angle of 180° (prior art).

Graph in FIG. 4 corresponds to a meter equipped with a four radiating ribs pressure plate, said four ribs being disposed along radii at 90° intervals.

Graph in FIG. 5 corresponds to the meter according to the above-described embodiment of the invention: a meter equipped with a four radiating ribs pressure plate, two consecutive ribs of the same set being disposed at an angle of 54°.

Graph in FIG. 3 shows it is possible to regulate the error curves of a prior art meter, that is to shift the error obtained for the three different values of flow rate Qmin, Qt, Qmax so as to inscribe it within the error channel represented by both parallel lines at +5 and −5% error values, respectively. At angles above 120°, the three curves are all shifted up within the error channel and adopt approximately the same slope gradient with a large regulation angle. It is to be noted that the ideal meter is obtained when the three curves merge or are strictly parallel and are not too steeply for a large regulation angle. However, the three curves in FIG. 3 are steeply and not strictly parallel (or not very close one from another).

This graph also reveals that the prior art meter suffers from a mediocre sensitivity at low flow rates.

As can be seen from FIG. 4, the Applicant found that increasing the number of ribs improves the sensitivity of the meter at low flow rates.

However, with such an equipped meter it is only possible to regulate the error curves between angles 30° and 50°, that is with a small regulation angle, and the regulation effect is not sufficient (the three curves are not very close one from another or are not strictly parallel).

In FIG. 5, it is clearly shown that a large range of regulation can be obtained lying from angles 60° to 130° (the three curves tend to merge without being too steeply), as well as a very good sensitivity at low flow rates (Q min).

In a further embodiment of the invention which is not represented in the Figures, the meter can be of wet type and the hub 26 is extended by a shaft which passes through the second end wall via an aperture. The end of the shaft is toothed and meshes with the inlet to the totalizer.

With another configuration of turbine corresponding to 8 blades disposed at an angle of 45°, according to the invention it is possible, for instance, to design a six ribs pressure plate, two consecutive ribs of the same set of three ribs being disposed at an angle of approximately 30° (I=1).

With a further configuration of turbine corresponding to 12 blades disposed at an angle of 30°, according to the invention it is possible, for instance, to design a four ribs pressure plate in which two consecutive ribs of the same set of two ribs are disposed at an angle of approximately 45° (I=1).

For instance, a six ribs pressure plate in which two consecutive ribs of the same set of three ribs are disposed at an angle of approximately 35° (I=2) can also be used with the 12 blades turbine configuration to attain the object of the invention.

In the above-mentioned examples, "approximately" means that the α value is inscribed within a range of ±5% of the calculated α value.

I claim:

1. A single jet liquid meter comprising:
   a measuring chamber having first and second end walls perpendicular to the axis of the measuring chamber and opposite to each other, an injector and an ejector in communication with the measuring chamber, a turbine having a plurality of blades, two consecutive blades being disposed at an angle β, at least one end wall being constituted by a plate having two faces and being equipped on one of the two faces with n radiating ribs projecting in the measuring chamber, the meter being characterized in that n is an even number at least equal to four, the radiating ribs being equally distributed in two sets, each set of radiating ribs corresponding to one half circle of the one plate face and two consecutive ribs of the same set being disposed at an angle α which is determined by the following conditions:

$$\alpha = (I + 2/n)\beta/(n/2 - 1)$$

and $$(n/2 - 1)\alpha < 90°$$

I being an integer value greater or equal to zero.

2. A meter according to claim 1, characterized in that n equals to four.

3. A meter according to claim 2, characterized in that I is less than three when β equals approximately to 30°, 36° or 45°.

4. A meter according to claim 1, characterized in that I equals to one and $\alpha$ equals approximately to 54°, that is within a range of ±5% of said $\alpha$ value.

5. A meter according to claim 1, characterized in that n equals to six.

6. A meter according to claim 1, characterized in that n equals to eight.

7. A meter according to claim 5, characterized in that I is greater than zero when $\beta$ equals approximately to 30°, 36° or 45°.

8. A meter according to claim 1, characterized in that said meter further comprises a totalizer mounted adjacent the second end wall of the measuring chamber.

9. A meter according to claim 8, characterized in that the end wall of the measuring chamber which is constituted by a plate equipped with n radiating ribs projecting in the measuring chamber corresponds to the second end wall of the measuring chamber.

\* \* \* \* \*